(12) United States Patent
Gotesman et al.

(10) Patent No.: US 7,860,074 B2
(45) Date of Patent: Dec. 28, 2010

(54) METHOD AND APPARATUS FOR ALLOCATING COMMUNICATION RESOURCES

(75) Inventors: Alexander Gotesman, Downsview (CA); Jahan Ali, Markham (CA)

(73) Assignee: Motorola, Inc., Schaumburg, IL (US)

( * ) Notice: Subject to any disclaimer, the term of this patent is extended or adjusted under 35 U.S.C. 154(b) by 2146 days.

(21) Appl. No.: 10/631,662

(22) Filed: Jul. 31, 2003

(65) Prior Publication Data

US 2005/0111431 A1   May 26, 2005

(51) Int. Cl.
*H04B 7/212* (2006.01)
(52) U.S. Cl. .................. 370/347; 370/345; 370/442; 370/431; 455/450; 455/422.1
(58) Field of Classification Search ............... 370/458, 370/459, 347, 345, 442, 431; 455/450, 451, 455/452.1, 452.2, 453, 422.1
See application file for complete search history.

(56) References Cited

U.S. PATENT DOCUMENTS

| | | | | | |
|---|---|---|---|---|---|
| 4,980,886 | A | * | 12/1990 | Bernstein | .................. 370/433 |
| 5,983,112 | A | * | 11/1999 | Kay | ........................... 455/504 |
| 6,157,627 | A | * | 12/2000 | Olofsson et al. | ............ 370/329 |
| 6,631,124 | B1 | * | 10/2003 | Koorapaty et al. | .......... 370/337 |
| 7,522,924 | B2 | * | 4/2009 | Abeta et al. | .............. 455/452.2 |
| 2002/0031119 | A1 | * | 3/2002 | Brouet et al. | ............... 370/386 |
| 2002/0051424 | A1 | * | 5/2002 | Krishnamoorthy et al. | .. 370/204 |
| 2002/0102984 | A1 | * | 8/2002 | Furuskar et al. | ............. 455/452 |
| 2005/0002375 | A1 | * | 1/2005 | Gokhale et al. | ............. 370/347 |

* cited by examiner

*Primary Examiner*—Ajit Patel
*Assistant Examiner*—Khai M Nguyen
(74) *Attorney, Agent, or Firm*—Indira Saladi; Valerie M. Davis (57) ABSTRACT

In a communication system (10) having a pool of communication resources (11), such resources are preferentially allocated amongst a plurality of communication services (such as, for example, voice services, single-slot packet data services, and multi-slot packet data services) in a manner that tends to facilitate subsequent expansion of selected services (such as multi-slot packet data services). In a preferred embodiment, the allocation process also tends to favor balanced as versus unbalanced expansion of certain services when comparing one physical carrier that supports the service against another physical carrier that also supports that service.

26 Claims, 8 Drawing Sheets

S = SINGLE SLOT PACKET DATA
M = MULTI SLOT PACKET DATA
V = VOICE SERVICE

METHOD AND APPARATUS FOR ALLOCATING COMMUNICATION RESOURCES

TECHNICAL FIELD

This invention relates generally to communication systems and more particularly to the allocation of communication resources.

BACKGROUND

Communication systems of various kinds are known in the art including wireless communication systems that trunk, or flexibly allocate and share, one or more communication resources amongst a plurality of potential and actual users. Such communication resources can include, for example, one or more carrier frequencies (including both radio and optical frequencies), time slots, spreading codes, and the like. In general, many such systems allocate (and de-allocate) such communication resources on an as-needed basis.

As the nature of the communication resource becomes more complicated, and particularly as the nature of the communication services being facilitated become more varied from one another, known communication resource allocation methodologies do not always lead to a desired or favorable allocation pattern. For example, some multi-carrier/multi-time slot systems serve multiple services such as a voice service and a multi-slot packet data service. The former tend to be characterized by relatively short session times while the latter tend towards longer session times. Furthermore, the former are usually serviceable with a single slot assignment while the latter often require expansion beyond the assignment of a single slot. While the dynamics of multi-slot packet data services hold the potential for both effective and efficient use of limited communication resources, present communication resource allocation methods and mechanisms often leave this potential substantially frustrated or unmet due, at least in part, to differences in characteristic system usage patterns and behaviors.

BRIEF DESCRIPTION OF THE DRAWINGS

The above needs are at least partially met through provision of the method and apparatus for allocating communication resources described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a pool of communication slots as supported by a plurality of physical carriers are provided, wherein at least some of the communication slots share a common physical carrier. These communication slots are allocated to serve the communications needs of at least a first communication service and a second communication service. Upon determining a need to allocate a communication slot to support the first communication service, one preferentially allocates, when available, a communication slot from whichever of the physical carriers: (1) does not already have a communication slot that is supporting the first communication service; and (2) has a highest number of presently unallocated communication slots. Upon determining a need to allocate a communication slot to support the second communication service, one preferentially allocates, when available, a communication slot from whichever of the physical carriers does not already have a communication slot that is supporting the first communication slot.

Pursuant to a preferred embodiment, the first communication service comprises a multi-slot packet data service and the second communication service comprises another service (such as, for example, a voice service or a single-slot communication service).

It is possible that all of the physical carriers that have an unallocated communication slot also already have a communication slot that is supporting the first communication service. When this occurs, in a preferred approach, one then preferentially avoids allocating a communication slot that, once allocated, will tend to further contribute to an unequal potential allocation of communication slots as between the physical carriers that support the first communication service. For the purposes of making such a determination, and also pursuant to a preferred approach, one can equate unallocated communication slots with communication slots that are allocated to support the first communication service.

Pursuant to one embodiment, to allocate a communication slot to support the second communication service, one identifies physical carriers that have at least one unallocated communication slot to provide a plurality of candidate physical carriers and then identifies a particular communication slot by preferentially preferring a communication slot from a physical carrier such that, once allocated to support the second communication service, the total number of communication slots per each of the candidate physical carriers that are either unallocated or that are allocated to support the first communication service will be more equal than prior to allocating the communication slot to support the second communication service. That identified communication slot is then allocated to support the second communication service.

Pursuant to yet another embodiment, expansion and/or contraction of the number of communication slots as are allocated to support a given multi-slot packet data service is governed, at least in part, through use of a predetermined value. In particular, upon determining a need to expand the multi-slot packet data service on a given one of the physical carriers that has presently unallocated communication slots, one allocates at least one presently unallocated communication slot to expand the service when a total number of unallocated communication slots for a predetermined plurality of the physical carriers at least equals the predetermined value. Pursuant to another embodiment, when this total number is less than the predetermined value, additional communication slots can be withheld and/or communication slots as are presently allocated for this purpose can be de-allocated and returned to the pool of available communication resources.

So configured, varying communication services are efficiently and suitably supported by a multi-channel communication system. These embodiments are particularly useful when supporting communication services that tend to differ from another with respect to duration of average session activity and/or when at least one of the communication services comprises a multi-channel service (such as, but not limited to, a multi-slot packet data service). Resource allocations made pursuant to these embodiments also tend to permit subsequent allocation decisions that yield better optimized usage of the communication resources that are available to a given system.

Elaboration on these various embodiments will be provided below in conjunction with more detailed descriptions and examples.

Figure 1:
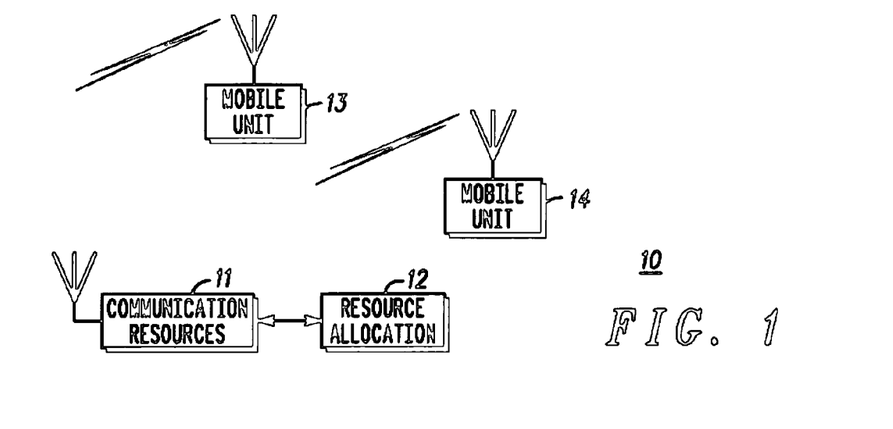
FIG. 1 comprises a system block diagram as configured in accordance with an embodiment of the invention.

Referring now to FIG. 1, an exemplary communication system 10 comprises, for purposes of the following descriptions, a wireless communications system. This system 10 has a pool of communication resources 11 preferably comprising a plurality of physical carrier transmitters wherein each physical carrier is comprised of a plurality of allocable communication slots. For example, this pool may comprise four radio frequency bearer carriers that are each subdivided with respect to time into four communication slots (such arrangements are well understood in the art and additional detail in this regard will not be presented here for the sake of brevity and the preservation of clarity and focus). A resource allocation unit 12 serves, at least in part, to allocate (typically on an as-needed basis) such communication resources to support communications by and/or between mobiles units (with only two such mobile units 13 and 14 being illustrated in this depiction for the sake of simplicity).

Such a communication system 10 will preferably support two or more communication services. For example, such a system 10 might support one or more multi-slot packet data services, single-slot packet data services, voice services, and so forth as appropriate to suit the needs of a given application or user group(s).

Depending upon which communication service may presently (or imminently) require an allocated communication resource, and depending further upon a variety of other criteria as set forth below, the resource allocation unit 12 allocates communication resources in general (and, in this exemplary illustration, one or more communication slots on one or more given corresponding physical carriers) to support and facilitate such communications. As will be described below in more detail, the resource allocation unit 12 makes such allocation decisions as a function, at least in part, of the particular service presently needing an allocation, present resource allocations, and such other criteria as may be suitable or appropriate to inform this decision making process.

The resource allocation unit 12 can be an independent platform, an integrated platform that serves other functionality as well, or can be virtual in the sense that its functionality as set forth below is distributed over one or more other system (or extra-system) components or elements, such architectural choices being generally well understood and appreciated in the art.

Figure 2:
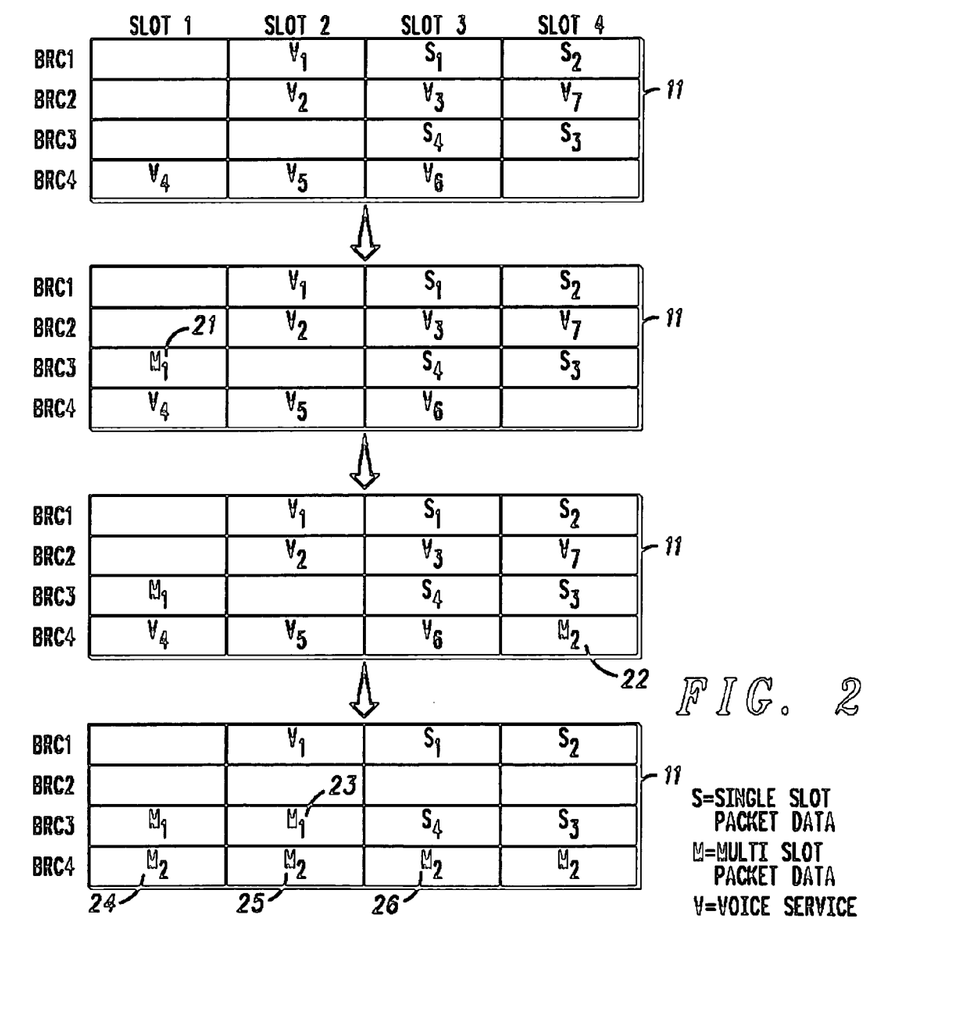
FIG. 2 depicts an illustrative example of communication resource allocation.

Prior to describing these embodiments in further detail, it may aid the reader to first review and appreciate a simple resource allocation example that illustrates and highlights, to some extent, at least one problem that can result with some allocation schemes. With reference to FIG. 2, a pool of communication resources 11 for a given system includes, in this example, four physical carriers (BRC1, BRC2, BRC3, and BRC4) with each such physical carrier being subdivided with respect to time into four communication slots (SLOT 1, SLOT 2, SLOT 3, and SLOT 4). At a point in time when this example begins, these resources 11 have been allocated to support various voice, single-slot packet data, and multi-slot packet data services as shown (for example, SLOT 2 on the first physical carrier BRC1 supports a first voice service communication while SLOT 3 on that same physical carrier supports a first single-slot service communication). This leaves, at this point in time, five unallocated communication slots.

In this example, a next communication requiring support comprises a multi-slot packet data service communication M1. The third physical carrier BRC3 has two unallocated communication slots as versus only one each for the remaining three carriers and hence appears to have the greatest quantity of present capacity. This being so, the new communication M1 is allocated SLOT 1 21 on that third physical carrier BRC3. Shortly thereafter, a second multi-slot packet data service communication M2 allocation becomes necessary, and the system allocates SLOT 4 22 of the fourth physical carrier BRC4 to support this communication.

In general, multi-slot packet data communications, once initiated, tend towards longer session durations while voice service communications and single-slot packet data communications tend towards shorter durations (though the single-slot packet data services communications tend to run longer than the average voice service session). Therefore, over time and as shown in the final depiction of the pool of resources 11, some of the voice service communications have concluded and their respective communication slots have became available for allocation. As a result, the second multi-slot packet data service session M2 has been able to expand into three additional communication slots 24, 25, and 26 on the fourth physical carrier BRC4. During this same time, however, the first multi-slot packet data service session M1 has only been able to expand into one additional communication slot 23 due to the persistence of the single slot packet data service communications that are continuing on that third physical carrier BRC3. As a result, the system is not providing balanced support of multi-slot packet data services with these resources—instead, one multi-slot packet data service session M2 has twice the resources of the other multi-slot packet data service session M1. The various embodiments set forth herein aid in avoiding this and other related mis-allocation conditions.

Figure 3:
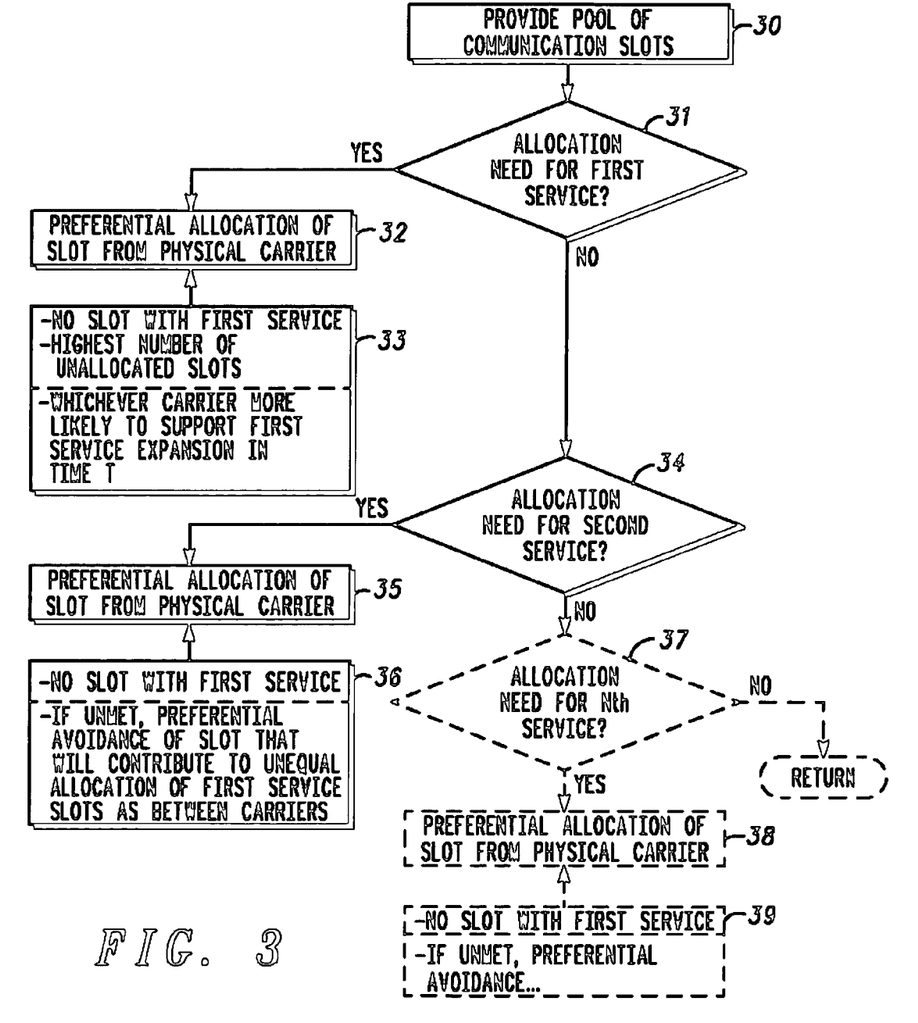
FIG. 3 comprises a flow diagram as configured in accordance with an embodiment of the invention.

Referring now to FIG. 3, in a preferred embodiment, one provides 30 a pool of communication resources comprising, for example, a pool of communication slots as supported by a plurality of physical carriers (in a preferred approach, at least some of the communication slots share a common physical carrier such that at least some of the physical carriers support a plurality of communication slots). It is not necessary, of course, that each physical carrier support a plurality of communication slots nor that the physical carriers be otherwise partitioned in time identically to one another. The process then determines whether a need 31 (or at least a potential need) exists to allocate one of the communication slots to support a first communication service. Such a need can be identified in any of a variety of ways. For example, one can assess present demand for existing communication slot allocations that support the first communication service. In one approach, the process receives (or is at least advised of) a request from a communication unit (such as one of the mobile units) to support or otherwise facilitate a communication pursuant to the first communication service.

When such a need at least appears to exist, the process makes 32 a preferential allocation of one or more specific communication slots from a particular identified physical carrier. In a preferred embodiment, this preferential allocation reflects deference to at least two guiding criteria 33:

that the communication slot is allocated from a physical carrier that does not already have a communication slot that is supporting the first communication service; and that the communication slot is allocated from a physical carrier that has a highest number of presently unallocated communication slots as compared to the other physical carriers.

If desired, this preference criteria can be optionally expanded to include preferentially allocating a communication slot from whichever of the physical carriers offers a present greatest likelihood of having a greatest number of available communication slots within at least a predetermined period of time that can be further allocated to expand support of the first communication service. The predetermined period of time can be selected as appropriate to suit the needs of a given context and application, and can be on the order of, for example, a few minutes or a few tens of minutes. This likelihood can be determined in a variety of ways. For example, typical average session duration values can be provided or calculated for the various communication services and those values then used to essentially predict which physical carrier most likely features communication slots that will likely be de-allocated within the predetermined period of time as the communication services being supported with those communication slots come to their respective individual conclusions. So configured, a physical carrier having one unallocated communication slot and three communication slots that are presently allocated to support voice communications can be identified as likely having more available expansion room in the relatively near future than, for example, a physical carrier having two unallocated communication slots and two communication slots that are allocated to supported typically longer lived single-slot packet data service communications.

The process also determines 34 when communication slots may need allocating to support the second communication service (as before, such a determination can be based upon a variety of criteria including a general assessment of present demand for existing communication slot allocations that support the second communication service and/or receipt of a request from a communication unit seeking support for the second communication service). When such a need exists, the process then makes a preferential allocation 35 of one or more specific communication slots from a given physical carrier in accordance with corresponding decision making criteria 36 at least comprising a preference for allocating, when available, a communication slot from whichever of the physical carriers does not already have a communication slot that supports the first communication service.

If desired, this criteria can optionally provide for a supplemental criteria to apply when all of the physical carriers that have an unallocated communication slot also already have a communication slot that supports the first communication service. In particular, pursuant to this optional additional criteria, the process preferentially avoids allocating a communication slot that, once allocated to support the second communication service, will tend to further contribute to an unequal potential allocation of communication slots as between the physical carriers that support the first communication service. In general, such a preference can again be based upon a differentiated view of the average duration of a communication session for at least some (and preferably all) of the different communication services that are supported by the system. When making such a determination, in a preferred embodiment, unallocated communication slots are treated as being essentially equal as regards resource usage impact to communication slots that are allocated to support the first communication service.

Figure 4:
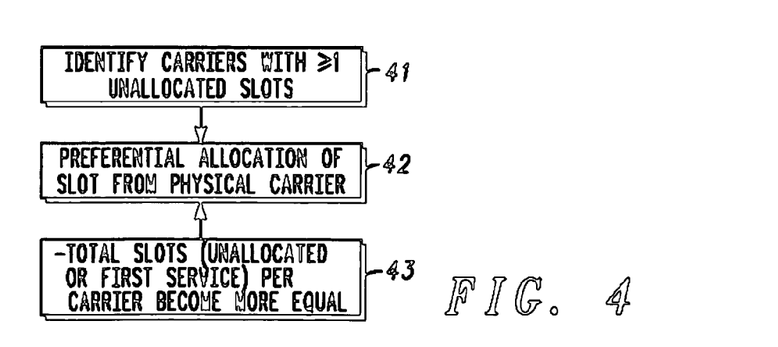
FIG. 4 comprises a detail flow diagram as configured in accordance with an embodiment of the invention.

As one more particular example of how one may preferentially avoid a communication slot that, once allocated to support the second communication service, would tend to further contribute to an unequal potential allocation of communication slots as between the physical carriers that support the first communication service, and referring momentarily to FIG. 4, the process can identify 41 those physical carriers that have at least one unallocated communication slot to provide a plurality of candidate physical carriers. The process can then preferentially allocate 42 a communication slot by preferentially preferring 43 a communication slot from a physical carrier such that, once allocated to support the second communication service, the total number of communication slots per each of the candidate physical carriers that are either unallocated or that are allocated to support the first communication service will be more equal than prior to allocating the communication slot to support the second communication service. (For example, if a system had only two physical carriers, and if a first physical carrier had two unallocated slots and the second physical carrier had three unallocated slots and one slot allocated to the first service, then the second service would be allocated to the second physical carrier, as that would result in two slots (unallocated or allocated to the first service) for the first physical carrier and three slots (unallocated or allocated to the first service) for the second carrier, which is more equal to one another than allocating the second service to the first physical carrier which would result in one slot (unallocated or allocated to the first service) for the first carrier and four slots (unallocated or allocated to the first service) for the second carrier.)

So configured, the process employs a positive criteria to encourage a pattern of resource allocation that will, in many cases (and based again upon the relative variations between these services as regards respective usage), better permit the subsequent expansion or support for the first service in a way that also tends to avoid unequal partitioning of the resources with respect to those physical carriers that are supporting first service communications.

Referring again to FIG. 3, many communication systems will include more than two communication services. These same kinds of allocation decisions can be further extended to accommodate, as appropriate, such additional services. For example, any number of additional services up to and including an "Nth" service can be provided. As before, the process can determine 37 whether an allocation need exists for the Nth service. (And again, such a determination can be based upon any appropriate and available information including, for example, assessing present demand for existing communication slot allocations that support the Nth communication service and/or receiving a request from a communication unit for the Nth communication service.)

In this example, also as before, the process can preferentially allocate 38 a communication slot to support the Nth communication service pursuant to criteria 39 such as preferentially allocating one of the communication slots from whichever of the physical carriers does not already have a communication slot that is supporting the first communication service when available. And again as before, optionally, the process can preferentially avoid allocating a communication slot that, once allocated to support the Nth communication service, would tend to further contribute to an unequal potential allocation of communication slots as between the physical carriers that support the first communication service. Such a preference can be effected, in part, as based upon an analysis that essentially equates the resource usage impact of:
- unallocated communication slots;
- communication slots that are allocated to support the first communication service; and
- communication slots that are allocated to support the second communication service.

Figures 5, 6:
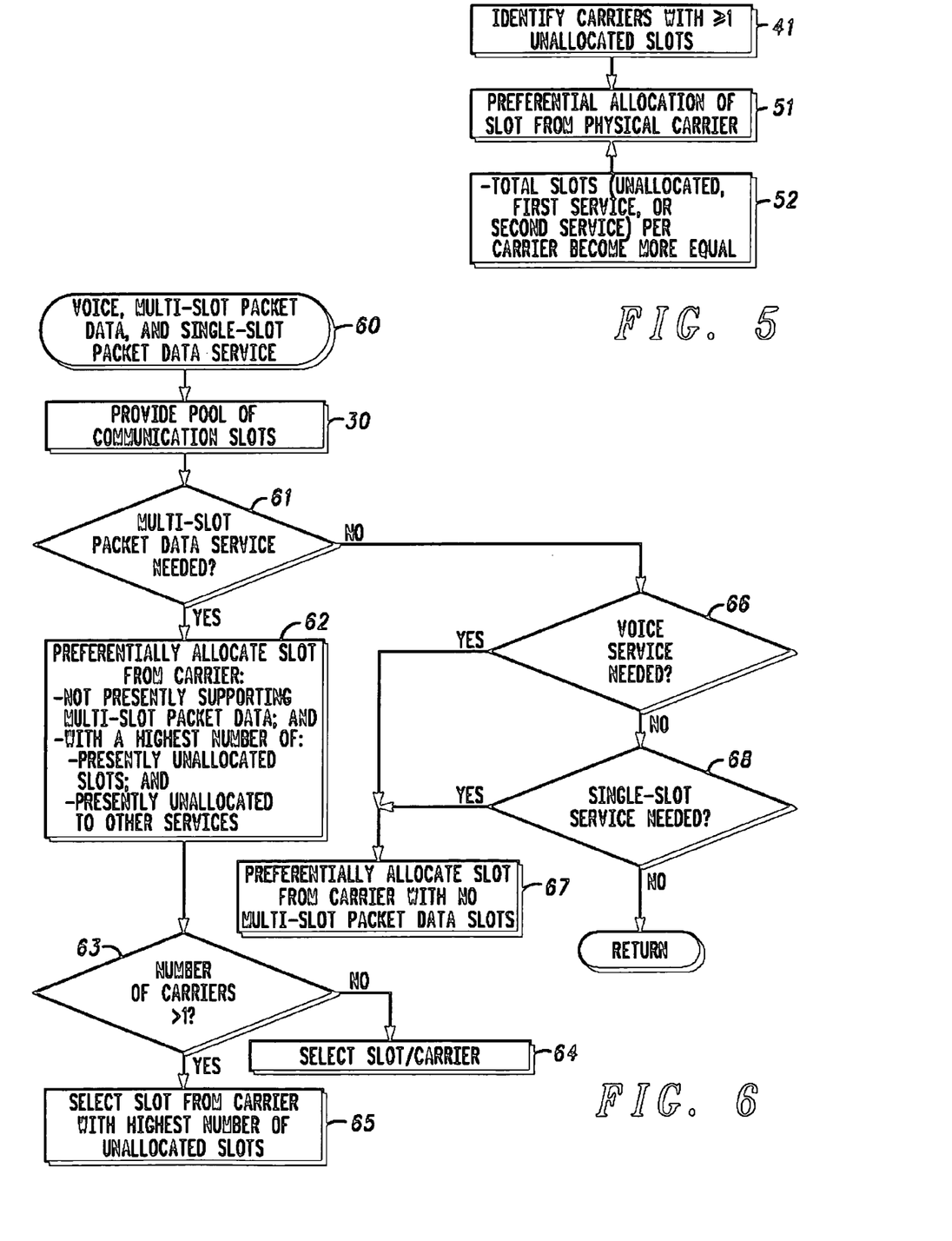
FIG. 5 comprises a detail flow diagram as configured in accordance with another embodiment of the invention.
FIG. 6 comprises a flow diagram as configured in accordance with another embodiment of the invention.

As one approach to effecting such a preferential allocation, and referring now to FIG. 5, the process can identify 41 physical carriers that have at least one unallocated communication slot to provide a plurality of candidate physical carriers. The process then preferentially allocates 51 a particular communication slot using criteria 52 that encourages preferring a communication slot from a physical carrier such that, once allocated to support the Nth communication service, the total number of communication slots per each of the candidate physical carriers that are either unallocated, or that are allocated to support the first communication service, or that are allocated to support the second communication service, will be more equal than prior to allocating the communication slot to support the Nth communication service.

Such an approach can well serve the needs of allocating a service, such as single-slot packet data service, that tends to exhibit a shorter typical session cycle than does another service (such as multi-slot packet data service) while also tending to exhibit a longer typical session cycle than another service (such as a voice service).

Referring now to FIG. 6, a more specific embodiment employing at least some of these preferences and approaches will be described.

In this embodiment, the system supports a voice service, a multi-slot packet data service, and a single-slot packet data service 60. As before, the system provides 30 a pool of communication slots. Upon determining 61 that the multi-slot packet data service requires a communication slot allocation, the process preferentially allocates 62 a communication slot from a physical carrier that:
- does not already have a communication slot that is supporting the multi-slot packet data communication service; and
- when available, has a highest number of presently unallocated communication slots and communication slots that are allocated to support the voice service (or, optionally, that are allocated to support either of the voice service and the single-slot packet data service).

When the process determines 63 that more than one of the physical carriers has a same maximum number of presently un-allocated communication slots and communication slots that are presently allocated to support the voice service (or, optionally, that are allocated to support either of the voice service and the single-slot packet data service), the process preferentially selects 65 a communication slot from whichever physical carrier has a highest number of unallocated slots. Otherwise, the process simply selects 64 a particular communication slot and physical carrier as informed by the preferential criteria already noted.

Again, these preferences tend to aid in facilitating an allocation of communication resources that better ensure a more evenly distributed support of the multi-slot packet data service over the available resources of the system and also to aid in ensuring expansion opportunities for this particular type of service.

Upon determining 66 a need to allocate a communication slot to support the voice service, the process preferentially 67 allocates, when available, one of the communication slots from whichever of the physical carriers does not already have a communication slot that is supporting the multi-slot packet data communication service. Again, this preference can be realized, at least in part, by preferentially avoiding allocation of a communication slot that, once allocated to support the voice service, will tend to further contribute to an unequal potential allocation of communication slots as between the physical carriers that support the multi-slot packet data communication service. For example, the process can identify the physical carriers that have at least one unallocated communication slot to provide a plurality of candidate physical carriers and then identify a particular communication slot by preferentially preferring a communication slot from a physical carrier such that, once allocated to support the voice service, the aggregate number of communication slots per each of the candidate physical carriers that are either unallocated or that are allocated to support the multi-slot packet data communication service will be more equal than prior to allocating the communication slot to support the voice service.

Upon determining 68 a need to support the single-slot service, the process can again preferentially allocate 67 a communication slot from a physical carrier having no communication slots that are presently allocated to support the multi-slot packet data service. In a preferred embodiment, this includes preferentially avoiding a communication slot that, once allocated to support the single-slot packet data communication service, will tend to further contribute to an unequal potential allocation of communication slots as between the physical carriers that support the multi-slot packet data communication service. Pursuant to one embodiment, this can comprise identifying those physical carriers that have at least one unallocated communication slot to provide a plurality of candidate physical carriers and then identifying a particular communication slot by preferring a communication slot from a physical carrier such that, once allocated to support the single-slot packet data communication service, the aggregate number of communication slots per each of the candidate physical carriers that are any of:
- unallocated;
- allocated to support the multi-slot packet data communication service; or
- allocated to support the voice service;

will be more equal than prior to allocating the communication slot to support the single-slot packet data communication service.

As alluded to above, a single-slot packet data service ordinarily provides a single communication slot to support one or more communications while a multi-slot packet data service can allocate one or more communication slots to support one or (typically) more communications. In many instances, a given communication session for a multi-slot packet data service will begin with allocation of only a single communication slot. As communication activity with respect to that allocated communication slot wanes, the communication slot will be un-allocated. When activity waxes over time, however, additional communication slots are allocated to expand provision of and access to the service. In one embodiment, the process informs this allocation of expansion communication slots with one or more additional decision-making preferences.

Figure 7:
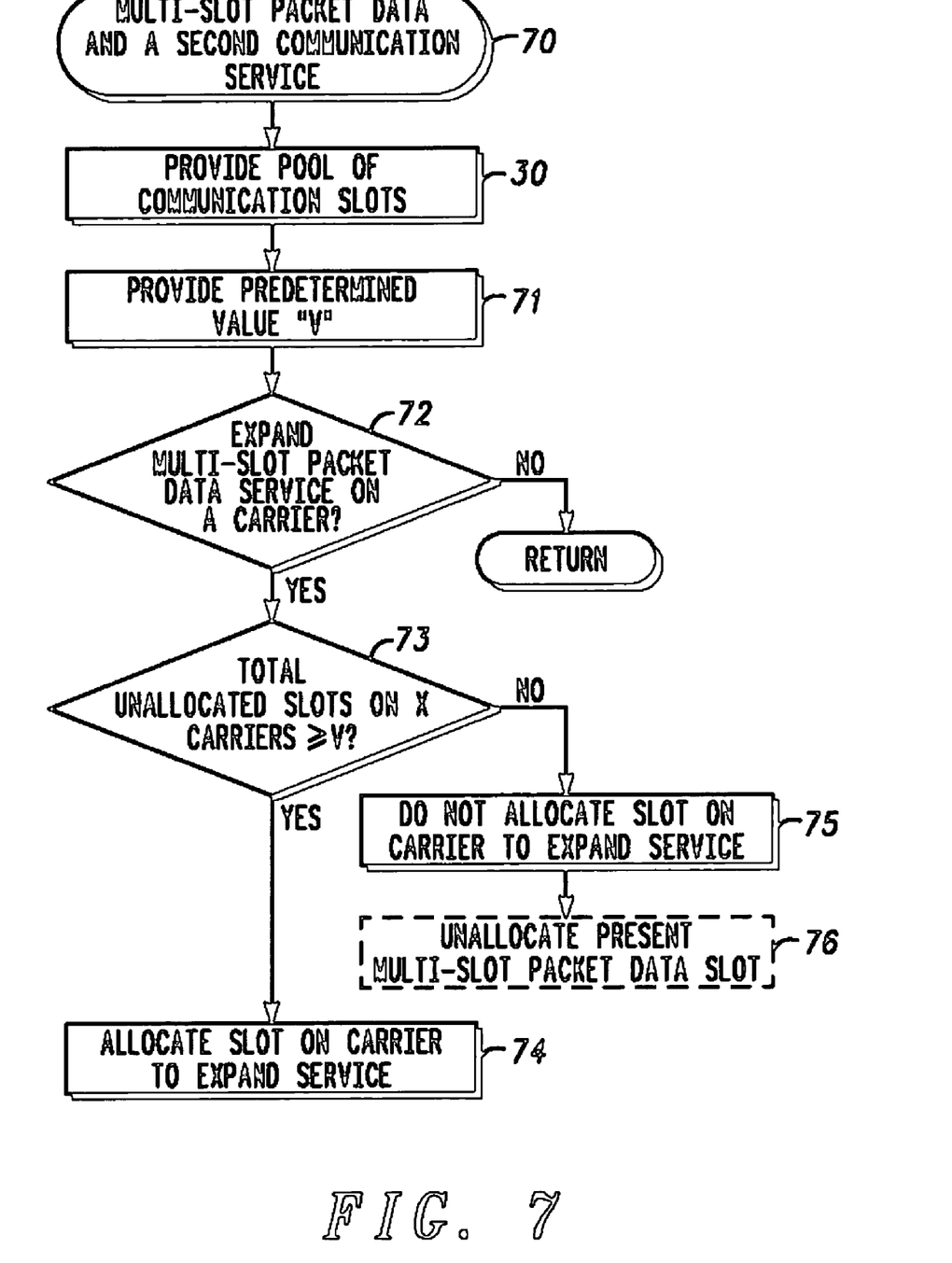
FIG. 7 comprises a flow diagram as configured in accordance with various embodiments of the invention.

For example, and referring now to FIG. 7, for purposes of illustration a given system may support a multi-slot packet data service and a second communication service 70. As before, the system provides 30 a pool of communication slots. In addition, the system provides 71 a predetermined value "V." The predetermined value V can and will vary with differing architectural parameters and performance requirements of a given system. Upon determining 72 that present multi-slot packet data service should be expanded, the process determines 73 whether a total number of unallocated communication slots for at least a predetermined plurality of the physical carriers (and preferably all of the physical carriers) as least equals the predetermined value V. When true, the process permits allocation 74 of a communication slot to facilitate expansion of the existing multi-slot packet data service.

When the total number of unallocated communication slots for the selected physical carriers does not at least equal the predetermined value V, the process does not allocate 75 additional communication slots to expand the multi-slot packet data service. This permits an adequate reserve of unallocated communication slots to be maintained for servicing other communication services (and particularly communication services characterized by shorter average communication slot session duration). For some applications, it may be desirable or appropriate to vary the value of the predetermined value V as a function of, for example, the day of the week and/or the time of day, as such factors can influence anticipated reserve requirements.

In an optional embodiment, the system, upon determining that an insufficient reserve quantity of communication slots exits, can de-allocate 76 one or more presently allocated multi-slot packet data service communication slots. Such de-allocation can occur as illustrated following a determination that an existing multi-slot packet data service should be expanded or can occur elsewhere in the process as desired and/or as appropriate to a given application.

Figure 11:
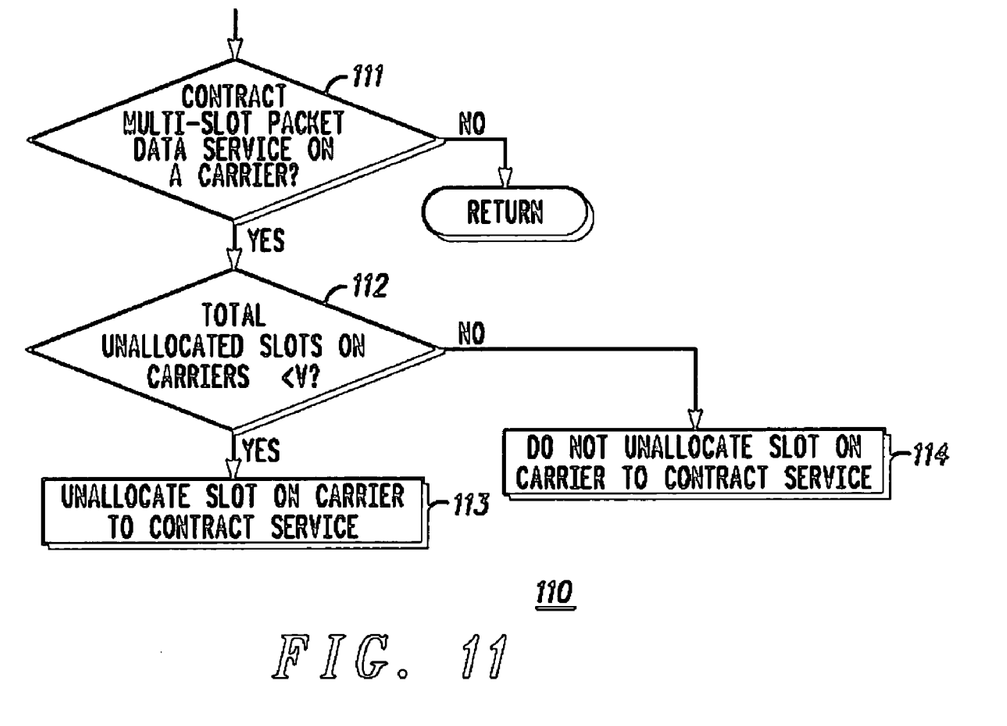
FIG. 11 depicts an optional embodiment to support automatic unallocation of slots.

As another optional embodiment, allocation of a slot to another service (such as, for example, a voice service), can be used to trigger a process to automatically determine whether to contract the number of slots that are presently allocated to this service. For example, and referring momentarily to FIG. 11, such a process 110 could determine 111 whether to consider contracting a service such as a multi-slot packet data service on one or more given carriers (as triggered, for example, by allocation of an existing unallocated slot to a voice service). If so, the process 110 can determine 112 whether the total number of presently unallocated slots is now less than the predetermined value V (which can be the same predetermined value as provided for service expansion purposes or a different value as may be appropriate to a given application). When true, the process 110 will preferably unallocate 113 a slot that has been previously allocated to support the multi-slot packet data service to thereby contract the service and render a larger available existing pool of unallocated resources. When not true, the process 110 can simply not unallocated 114 a slot in this fashion.

By informing the resource allocation process with preferences as outlined above, balanced and adequate future support can be more generally assured for various communication services, and particularly for multi-channel services. Three illustrative examples will now be provided.

EXAMPLE 1

Figure 8:
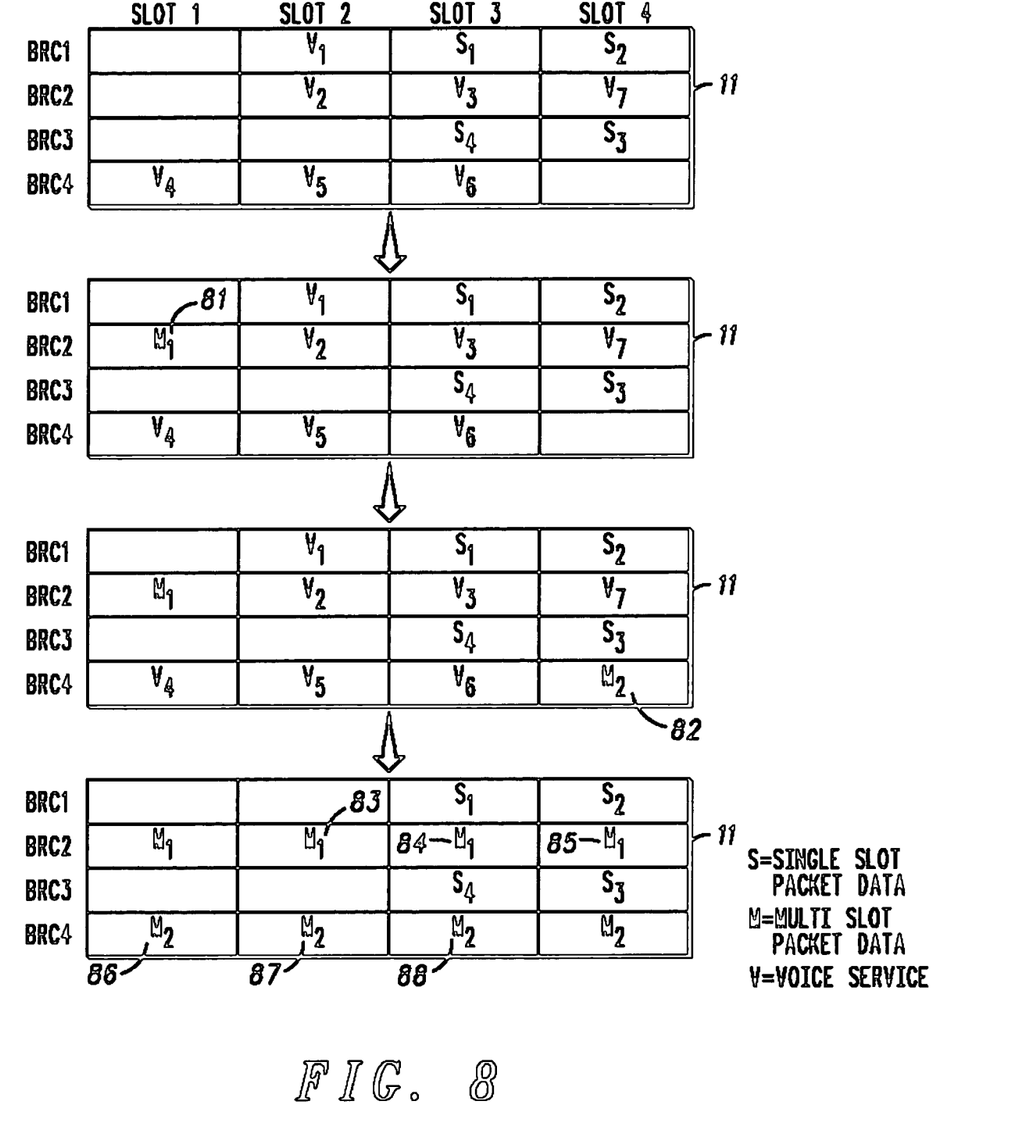
FIG. 8 depicts an illustrative example of communication resource allocation as configured in accordance with an embodiment of the invention.

In this example, the communication slots of a given four physical carrier pool 11 are initially allocated as first described above with respect to FIG. 2. Upon determining a need to allocate a communication slot for a first multi-slot packet data session M1, the allocation mechanism prefers the single available communication slot 81 of the second physical carrier BRC2 rather than, for example, either of the two open communication slots at the third physical carrier BRC3. This preference reflects the fact that the remaining three communication slots of the second physical carrier BRC2 are presently allocated to relatively short-lived voice service whereas the remaining two communication slots of the third physical carrier BRC3 are presently allocated to relatively longer-lived single-slot packet data services. Consequently, the second physical carrier BRC2 offers a greater likelihood of near term expansion opportunity for the multi-slot packet data service than does the third physical carrier BRC3.

In a similar fashion, the allocation mechanism selects an unallocated slot 82 of the fourth physical carrier BRC4 for a second multi-slot packet data session M2 as being preferred over the available communication slot of the first physical carrier BRC1. The three voice services being presently supported by the fourth physical carrier BRC4 offer a better likelihood of near term expansion opportunity than the one voice service and two single-slot packet data session communication slots of the first physical carrier BRC1.

The final representation of the pool 11 illustrates that both multi-slot packet data sessions M1 and M2 are able to fully expand across all four communication slots of their respective physical carriers BRC2 and BRC4 as the shorter-lived voice sessions conclude. It can also be appreciated that both multi-slot packet data sessions M1 and M2 were able to grow in a manner that roughly equates one to the other.

EXAMPLE 2

Figure 9:
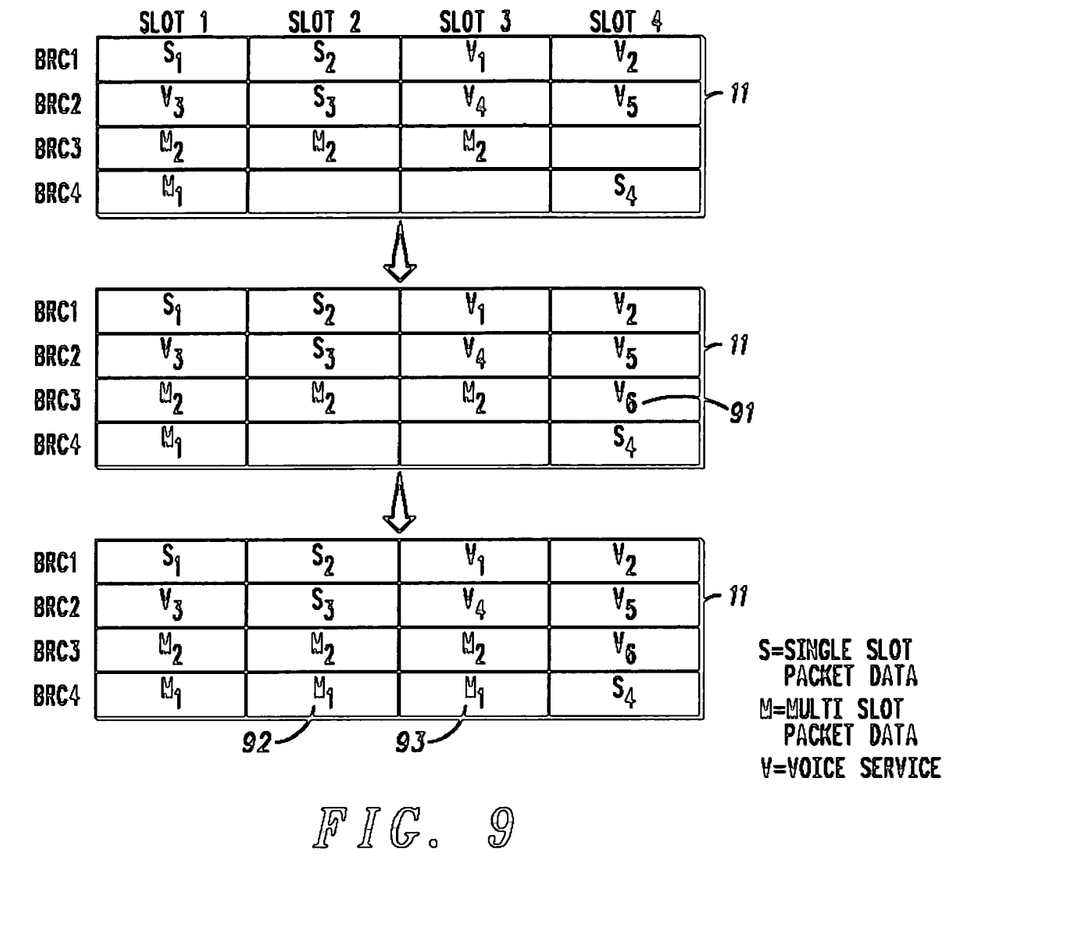
FIG. 9 depicts an illustrative example of communication resource allocation as configured in accordance with an embodiment of the invention.

In this example, a first multi-slot packet data session M1 has been allocated a single communication slot on the fourth physical carrier BRC4 while a second multi-slot packet data session M2 has been allocated three communication slots on the third physical carrier BRC3. Upon determining a need to allocate a communication slot to support a new voice session V6, the allocation mechanism prefers a communication slot 91 on the third physical carrier BRC3 notwithstanding the availability of a greater number of unallocated communication slots on the fourth physical carrier BRC4. By making the allocation in this way, the allocation mechanism has preferred an approach that avoids a greater potential unbalance between physical carriers with respect to multi-slot packet data communication slot allocations. In particular, while the second multi-slot packet data session M2 cannot expand beyond three communication slots at present, the first multi-slot packet data service M1 remains free to expand to an equal number of communication slots upon allocation of the two available communication slots 92 and 93 on the fourth physical carrier BRC4. Consequently, the allocation of a communication slot on the third physical carrier BRC3 to support the voice service did not tend to contribute toa future imbalance as between allocation of communication slots for multi-slot packet data services on the two physical carriers.

EXAMPLE 3

Figure 10:
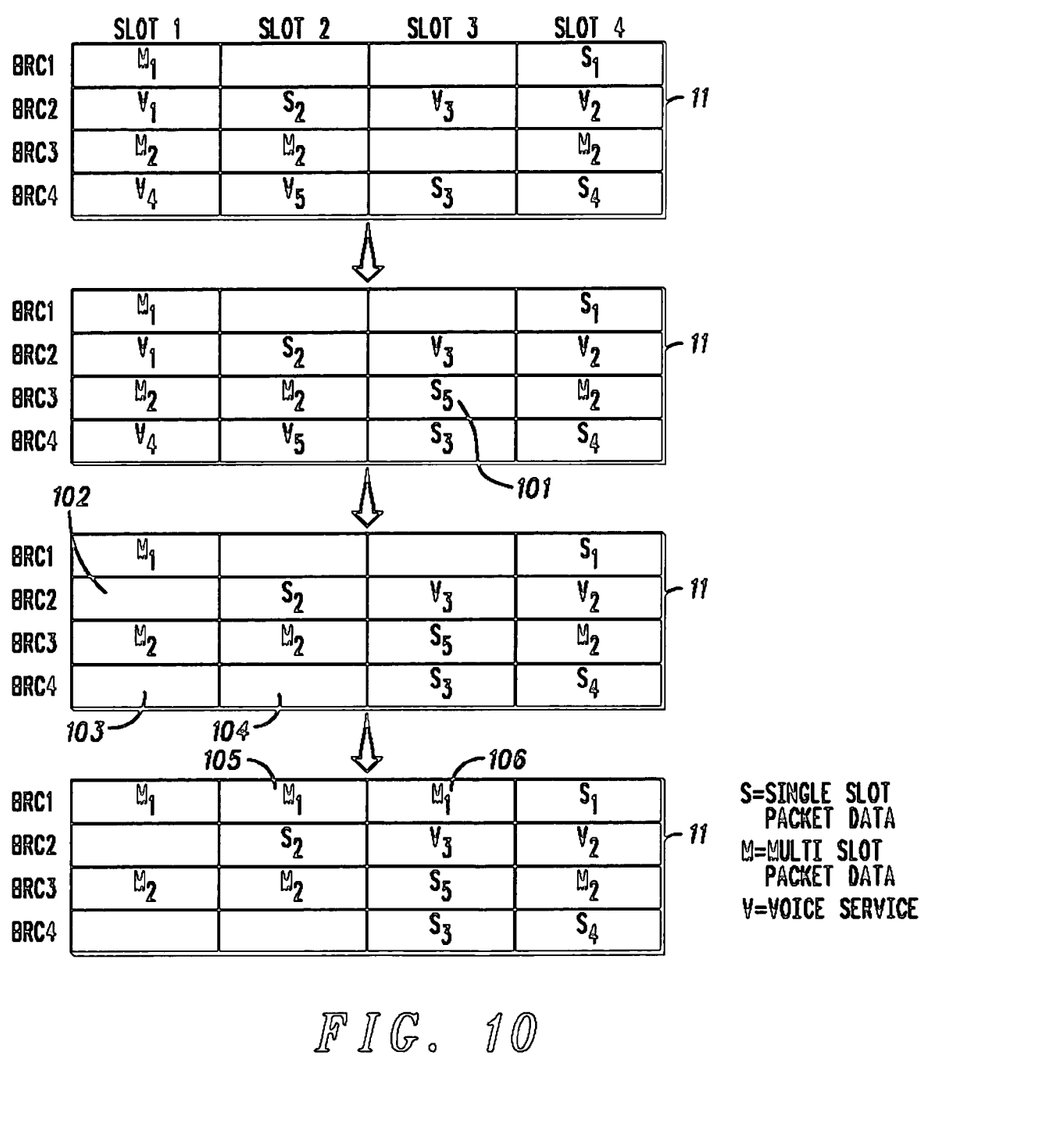
FIG. 10 depicts an illustrative example of communication resource allocation as configured in accordance with an embodiment of the invention.

In this last example, the first physical carrier BRC1 has a single communication slot allocated to support multi-slot packet data session M1 and the third physical carrier BRC3 has three communication slots allocated to support multi-slot packet data session M2. Upon determining that a communication slot needs to be allocated to support a single-slot packet data session S5, the allocation mechanism selects the last remaining communication slot 101 on the third physical carrier BRC3. This allocation reflects a preference to maintain a balance between likely available expansion opportunities for the two physical carriers that are supporting multi-slot packet data services. Within a relatively short period of time, the voice service communications will likely conclude and thereby free up their corresponding communication slots 102, 103, and 104. At the same time, the multi-slot packet data session M1 on the first physical carrier BRC1 can readily accommodate expansion that includes the two available communication slots 105 and 106. Again, it can be seen that the system tends towards equality and balance as regards allocation of communication slots for the multi-slot packet data service.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for allocating communication resources to support both a first communication service and a second communication service that is different from the first communication service, comprising:
   providing a pool of communication slots as supported by a plurality of physical carriers, wherein at least some of the communication slots share a common physical carrier;
   upon determining a need to allocate a communication slot from the pool of communication slots to support the first communication service, preferentially allocating, when available, one of the communication slots from whichever of the physical carriers:
     does not already have a communication slot that is supporting the first communication service; and
     has a highest number of presently unallocated communication slots; and
   upon determining a need to allocate a communication slot from the pool of communication slots to support the second communication service, preferentially allocating one of the communication slots from whichever of the physical carriers does not already have a communication slot that is supporting the first communication service when available,
     wherein preferentially allocating one of the communication slots from whichever of the physical carriers does not already have a communication slot that is supporting the first communication service when available further includes preferentially avoiding, when all of the physical carriers that have an unallocated communication slot also already have a communication slot that is supporting the first communication service, a communication slot that, once allocated to support the second communication service, will tend to further contribute to an unequal potential allocation of communication slots as between the physical carriers that support the first communication service.

2. The method of claim 1 wherein preferentially avoiding a communication slot that, once allocated to support the second communication service, will tend to further contribute to an unequal potential allocation of communication slots as between the physical carriers that support the first communication service further includes determining an allocation of communication slots as between the physical carriers by equating unallocated communication slots and communication slots that are allocated to support the first communication service.

3. The method of claim 2 wherein preferentially avoiding a communication slot that, once allocated to support the second communication service, will tend to further contribute to an unequal potential allocation of communication slots as between the physical carriers that support the first communication service further includes:
   identifying physical carriers that have at least one unallocated communication slot to provide a plurality of candidate physical carriers;
   identifying a particular communication slot by preferentially preferring a communication slot from a physical carrier such that, once allocated to support the second communication service, the total number of communication slots per each of the candidate physical carriers that are either unallocated or that are allocated to support the first communication service will be more equal than prior to allocating the communication slot to support the second communication service;
   allocating the particular communication slot to support the second communication service.

4. The method of claim 1 wherein providing a pool of communication slots as supported by a plurality of physical carriers, wherein at least some of the communication slots share a common physical carrier includes providing a pool of communication slots as supported by a plurality of physical carriers, wherein at least some of the communication slots share a common physical carrier comprising discrete radio frequency carriers.

5. The method of claim 1 wherein providing a method for allocating communication resources to support both a first communication service and a second communication service includes providing a method for allocating communication resources to support both a first communication service comprising packet data transmission services and a second communication service comprising real time voice transmission services.

6. The method of claim 1 wherein providing a method for allocating communication resources to support a first communication service comprising packet data transmission services includes supporting a first communication service comprising a variety of packet data transmission services.

7. The method of claim 1 wherein determining a need to allocate a communication slot from the pool of communication slots to support the first communication service includes receiving a request from a communication unit for the first communication service.

8. The method of claim 7 wherein determining a need to allocate a communication slot from the pool of communication slots to support the first communication services further includes assessing present demand for existing communication slot allocations that support the first communication service.

9. The method of claim 1 wherein determining a need to allocate a communication slot from the pool of communication slots to support the second communication service includes receiving a request from a communication unit for the second communication service.

10. The method of claim 9 wherein allocating a communication slot from the pool of communication slots to support the second communication service includes assessing present demand for existing communication slot allocations that support the second communication service.

11. The method of claim 1 wherein the method further allocates the communication resources to support a third communication service.

12. The method of claim 11 and further comprising:
upon determining a need to allocate a communication slot from the pool of communication slots to support the third communication service, preferentially allocating one of the communication slots from whichever of the physical carriers does not already have a communication slot that is supporting the first communication service when available.

13. The method of claim 12 wherein preferentially allocating one of the communication slots from whichever of the physical carriers does not already have a communication slot that is supporting the first communication service when available further includes preferentially avoiding, when all of the physical carriers that have an unallocated communication slot also already have a communication slot that is supporting the first communication service, a communication slot that, once allocated to support the third communication service, will tend to further contribute to an unequal potential allocation of communication slots as between the physical carriers that support the first communication service.

14. The method of claim 13 wherein preferentially avoiding a communication slot that, once allocated to support the third communication service, will tend to further contribute to an unequal potential allocation of communication slots as between the physical carriers that support the first communication service further includes determining an allocation of communication slots as between the physical carriers by equating unallocated communication slots, communication slots that are allocated to support the first communication service, and communication slots that are allocated to support the second communication service.

15. The method of claim 14 wherein preferentially avoiding a communication slot that, once allocated to support the third communication service, will tend to further contribute to an unequal potential allocation of communication slots as between the physical carriers that support the first communication service further includes:
identifying physical carriers that have at least one unallocated communication slot to provide a plurality of candidate physical carriers;
identifying a particular communication slot by preferentially preferring a communication slot from a physical carrier such that, once allocated to support the third communication service, the total number of communication slots per each of the candidate physical carriers that are either unallocated, or that are allocated to support the first communication service, or that are allocated to support the second communication service, will be more equal than prior to allocating the communication slot to support the third communication service;
allocating the particular communication slot to support the third communication service.

16. The method of claim 11 wherein preferentially allocating one of the communication slots from whichever of the physical carriers does not already have a communication slot that is supporting the first communication service when available further includes preferentially allocating one of the communication slots to the first communication service from whichever of the physical carriers offers a present greatest likelihood of having a greatest number of available communication slots within at least a predetermined period of time that can be further allocated to expand support of the first communication service.

17. The method of claim 16 wherein allocating one of the communication slots to the first communication service from whichever of the physical carriers offers a present greatest likelihood of having a greatest number of available communication slots within at least a predetermined period of time that can be further allocated to expand support of the first communication service further comprises preferentially allocating, when available, one of the communication slots from whichever of the physical carriers has a highest number of presently unallocated communication slots and communication slots that are allocated to support the second communication service.

18. The method of claim 17 wherein preferentially allocating one of the communication slots from whichever of the physical carriers has a highest number of presently unallocated communication slots and communication slots that are allocated to support the second communication service further comprises, when more than one physical carrier has a same maximum number of presently unallocated communication slots and communication slots that are allocated to support the second communication service, determining an allocation of communication slots as between the physical carriers by allocating a slot to the first communication service from the carrier that has a highest number of unallocated slots.

19. The method of claim 11 wherein allocating the communication resources to support a third communication service includes receiving a request from a communication unit for the third communication service.

20. The method of claim 19 wherein allocating the communication resources to support a third communication service further includes assessing present demand for existing communication slot allocations that support the third communication service.

21. A method for allocating communication resources to support a voice communication service, a multi-slot packet data communication service, and a single-slot packet data service, comprising:
providing a pool of communication slots as supported by a plurality of physical carriers, wherein at least some of the communication slots share a common physical carrier;
upon determining a need to allocate a communication slot from the pool of communication slots to support the multi-slot packet data communication service, preferentially allocating, when available, one of the communication slots from whichever of the physical carriers:
does not already have a communication slot that is supporting the multi-slot packet data communication service; and
has a highest number of presently unallocated communication slots and communication slots that are allocated to support the voice communication service; and
when more than one physical carriers have a same maximum number of presently unallocated communication slots and communication slots that are allocated to support the voice communication service, preferentially allocating a slot to the multi-slot packet data communication service from the carrier that has a highest number of unallocated slots;

upon determining a need to allocate a communication slot from the pool of communication slots to support the voice communication service, preferentially allocating one of the communication slots from whichever of the physical carriers does not already have a communication slot that is supporting the multi-slot packet data communication service when available;

upon determining a need to allocate a communication slot from the pool of communication slots to support the single-slot packet data communication service, preferentially allocating one of the communication slots from whichever of the physical carriers does not already have a communication slot that is supporting the multi-slot packet data communication service when available.

22. The method of claim 21 wherein:

upon determining the need to allocate a communication slot from the pool of communication slots to support the voice communication service further includes preferentially avoiding a communication slot that, once allocated to support the voice communication service, will tend to further contribute to an unequal potential allocation of communication slots as between the physical carriers that support the multi-slot packet data communication service further by:

identifying physical carriers that have at least one unallocated communication slot to provide a plurality of candidate physical carriers;

identifying a particular communication slot by preferentially preferring a communication slot from a physical carrier such that, once allocated to support the voice communication service, the total number of communication slots per each of the candidate physical carriers that are either one of:
unallocated; and
that are allocated to support the multi-slot packet data communication service;
will be more equal than prior to allocating the communication slot to support the voice communication service;

allocating the particular communication slot to support the voice communication service.

23. The method of claim 21 wherein: upon determining the need to allocate a communication slot from the pool of communication slots to support the single-slot packet data communication service further includes preferentially avoiding a communication slot that, once allocated to support the single-slot packet data communication service, will tend to further contribute to an unequal potential allocation of communication slots as between the physical carriers that support the multi-slot packet data communication service further by:

identifying physical carriers that have at least one unallocated communication slot to provide a plurality of candidate physical carriers;

identifying a particular communication slot by preferentially preferring a communication slot from a physical carrier such that, once allocated to support the single-slot packet data communication service, the total number of communication slots per each of the candidate physical carriers that are any of unallocated, allocated to support the multi-slot packet data communication service, and allocated to support the voice communication service, will be more equal than prior to allocating the communication slot to support the single-slot packet data communication service;

allocating the particular communication slot to support the single-slot packet data communication service.

24. An apparatus comprising:
a pool of communication resources comprising a plurality of physical carrier transmitters, wherein each physical carrier is comprised of a plurality of allocatable communication slots;
an allocation need detection unit;
an allocation unit that is responsive to the allocation need detection unit and the pool of communication resources for:
allocating a communication slot from the pool of communication slots to support a first communication service by preferentially allocating, when available, one of the communication slots from whichever of the physical carriers does not already have a communication slot that is supporting the first communication service; and
has a highest number of presently unallocated communication slots; and
communication slots that are allocated to support the second communication service; and
when more than one physical carriers have same maximum number of presently unallocated communication slots, and communication slots that are allocated to support the second communication service, a slot to the first communication service from the carrier that has highest number of unallocated slots.
allocating a communication slot from the pool of communication slots to support a second communication service, which second communication service is different from the first communication service, by preferentially allocating one of the communication slots from whichever of the physical carriers does not already have a communication slot that is supporting the first communication service when available.

25. The apparatus of claim 24 wherein the allocation unit is further for allocating a communication slot from the pool of communication slots to support a second communication service by preferentially avoiding a communication slot that, once allocated to support the second communication service, will tend to further contribute to an unequal potential allocation of communication slots as between the physical carriers that support the first communication service by:

identifying physical carriers that have at least one unallocated communication slot to provide a plurality of candidate physical carriers;

identifying a particular communication slot by preferentially preferring a communication slot from a physical carrier such that, once allocated to support the second communication service, the total number of communication slots per each of the candidate physical carriers that are either unallocated or that are allocated to support the first communication service will be more equal than prior to allocating the communication slot to support the second communication service;

allocating the particular communication slot to support the second communication service.

26. The apparatus of claim 25 wherein the allocation unit is further for allocating a communication slot from the pool of communication slots to support a third communication service by preferentially avoiding a communication slot that, once allocated to support the third communication service, will tend to further contribute to an unequal potential allocation of communication slots as between the physical carriers that support the first communication service by:

identifying physical carriers that have at least one unallocated communication slot to provide a plurality of candidate physical carriers;

identifying a particular communication slot by preferentially preferring a communication slot from a physical carrier such that, once allocated to support the third communication service, the total number of communication slots per each of the candidate physical carriers that are either unallocated, or that are allocated to support the first communication service, or that are allocated to support the second communication service, will be more equal than prior to allocating the communication slot to support the third communication service;

allocating the particular communication slot to support the third communication service.

* * * * *

UNITED STATES PATENT AND TRADEMARK OFFICE
CERTIFICATE OF CORRECTION

PATENT NO. : 7,860,074 B2
APPLICATION NO. : 10/631662
DATED : December 28, 2010
INVENTOR(S) : Gotesman et al.

Page 1 of 1

It is certified that error appears in the above-identified patent and that said Letters Patent is hereby corrected as shown below:

IN THE SPECIFICATION

In Column 10, Line 67, delete "toa" and insert -- to a --, therefor.

IN THE CLAIMS

In Column 13, Line 14, in Claim 12, delete "and further" and insert -- further --, therefor.

In Column 16, Line 29, in Claim 24, delete "slots." and insert -- slots, --, therefor.

Signed and Sealed this
Nineteenth Day of June, 2012

David J. Kappos
*Director of the United States Patent and Trademark Office*